(12) United States Patent
Bahar

(10) Patent No.: US 8,613,110 B2
(45) Date of Patent: *Dec. 17, 2013

(54) SOFTWARE PIRACY PREVENTION THROUGH REMOTE ENFORCEMENT OF AN ACTIVATION THRESHOLD

(75) Inventor: Reuben Bahar, West Hills, CA (US)

(73) Assignee: Uniloc Luxembourg S.A., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 13/451,477

(22) Filed: Apr. 19, 2012

(65) Prior Publication Data

US 2013/0055415 A1    Feb. 28, 2013

Related U.S. Application Data

(60) Continuation of application No. 13/196,158, filed on Aug. 2, 2011, which is a continuation of application No. 12/182,135, filed on Jul. 30, 2008, now abandoned, which is a continuation of application No. 11/311,964, filed on Dec. 19, 2005, now abandoned, which is a division of application No. 09/594,004, filed on Jun. 14, 2000, now Pat. No. 7,024,696.

(51) Int. Cl.
    *G06F 21/00*    (2013.01)
(52) U.S. Cl.
    USPC .............................................. 726/32
(58) Field of Classification Search
    None
    See application file for complete search history.

(56) References Cited

U.S. PATENT DOCUMENTS

| | | | |
|---|---|---|---|
| 4,654,799 A | 3/1987 | Ogaki et al. |
| 4,658,093 A | 4/1987 | Hellman |
| 4,688,169 A | 8/1987 | Joshi |
| 4,740,890 A | 4/1988 | William |
| 4,791,565 A | 12/1988 | Dunham et al. |
| 4,796,220 A | 1/1989 | Wolfe |
| 4,864,494 A | 9/1989 | Kobus, Jr. |

(Continued)

FOREIGN PATENT DOCUMENTS

| | | |
|---|---|---|
| AU | 678985 | 6/1997 |
| DE | 40 19 652 A1 | 1/1992 |

(Continued)

OTHER PUBLICATIONS

Rivest, R. "RFC 1321—The MD5 Message Digest Algorithm," Apr. 1992, Retrieved from the Internet on Jul. 21, 2005.

(Continued)

*Primary Examiner* — Lisa Lewis
(74) *Attorney, Agent, or Firm* — Sean D. Burdick

(57) ABSTRACT

A system and method for preventing piracy of a given software application limits the number of times that such software application is activated. A given software application must be activated in order to become fully functional. The user must provide a unique software identification code, relating to the specific software which the user is attempting to activate, to a remote provider. The remote provider determines the number of times that such specific software has already been activated, and provides an activation code to the user unless the number of activations exceeds a predetermined threshold. Once activated, the software becomes fully operational, and the user is allowed complete access to its functions.

13 Claims, 2 Drawing Sheets

(56) References Cited

U.S. PATENT DOCUMENTS

| | | | |
|---|---|---|---|
| 4,982,430 A | 1/1991 | Frezza et al. | |
| 4,999,806 A | 3/1991 | Chernow et al. | |
| 5,023,907 A | 6/1991 | Johnson et al. | |
| 5,103,476 A | 4/1992 | Waite et al. | |
| 5,199,066 A * | 3/1993 | Logan | 726/29 |
| 5,222,133 A | 6/1993 | Chou et al. | |
| 5,222,134 A | 6/1993 | Waite et al. | |
| 5,260,999 A | 11/1993 | Wyman | |
| 5,287,408 A | 2/1994 | Samson | |
| 5,291,598 A | 3/1994 | Grundy | |
| 5,319,705 A | 6/1994 | Halter et al. | |
| 5,337,357 A | 8/1994 | Chou et al. | |
| 5,343,526 A | 8/1994 | Lassers | |
| 5,379,433 A | 1/1995 | Yamagishi | |
| 5,388,211 A | 2/1995 | Hornbuckle | |
| 5,390,297 A | 2/1995 | Barber et al. | |
| 5,414,269 A | 5/1995 | Takahashi | |
| 5,440,635 A | 8/1995 | Bellovin et al. | |
| 5,483,658 A | 1/1996 | Grube et al. | |
| 5,490,216 A | 2/1996 | Richardson, III | |
| 5,509,070 A | 4/1996 | Schull | |
| 5,559,884 A * | 9/1996 | Davidson et al. | 713/187 |
| 5,638,513 A | 6/1997 | Ananda | |
| 5,745,879 A | 4/1998 | Wyman | |
| 5,754,763 A | 5/1998 | Bereiter | |
| 5,754,864 A | 5/1998 | Hill | |
| 5,790,664 A | 8/1998 | Coley et al. | |
| 5,835,911 A * | 11/1998 | Nakagawa et al. | 1/1 |
| 5,925,127 A | 7/1999 | Ahmad | |
| 5,974,150 A | 10/1999 | Kaish et al. | |
| 6,006,328 A | 12/1999 | Drake | |
| 6,009,401 A | 12/1999 | Horstmann | |
| 6,009,525 A | 12/1999 | Horstmann | |
| 6,044,471 A | 3/2000 | Colvin | |
| 6,067,582 A | 5/2000 | Smith et al. | |
| 6,070,171 A | 5/2000 | Snyder et al. | |
| 6,094,723 A | 7/2000 | Otsuka | |
| 6,098,106 A | 8/2000 | Philyaw | |
| 6,101,606 A | 8/2000 | Diersch et al. | |
| 6,134,659 A | 10/2000 | Sprong et al. | |
| 6,138,155 A | 10/2000 | Davis et al. | |
| 6,158,005 A | 12/2000 | Bharathan et al. | |
| 6,169,976 B1 | 1/2001 | Colosso | |
| 6,173,283 B1 | 1/2001 | Kasso et al. | |
| 6,189,146 B1 | 2/2001 | Misra et al. | |
| 6,226,747 B1 | 5/2001 | Larsson et al. | |
| 6,233,567 B1 | 5/2001 | Cohen | |
| 6,236,971 B1 | 5/2001 | Stefik et al. | |
| 6,243,468 B1 | 6/2001 | Pearce et al. | |
| 6,243,469 B1 | 6/2001 | Kataoka et al. | |
| 6,294,793 B1 | 9/2001 | Brunfeld et al. | |
| 6,327,617 B1 | 12/2001 | Fawcett | |
| 6,330,670 B1 | 12/2001 | England et al. | |
| 6,343,280 B2 | 1/2002 | Clark | |
| 6,363,486 B1 | 3/2002 | Knapton, III | |
| 6,418,472 B1 | 7/2002 | Mi et al. | |
| 6,449,645 B1 | 9/2002 | Nash | |
| 6,460,142 B1 | 10/2002 | Colvin | |
| 6,463,078 B1 | 10/2002 | Engstrom et al. | |
| 6,467,088 B1 | 10/2002 | alSafadi et al. | |
| 6,536,005 B1 | 3/2003 | Augarten | |
| 6,557,105 B1 | 4/2003 | Tardo et al. | |
| 6,587,837 B1 | 7/2003 | Spagna et al. | |
| 6,587,842 B1 | 7/2003 | Watts | |
| 6,609,114 B1 | 8/2003 | Gressel et al. | |
| 6,697,948 B1 | 2/2004 | Rabin et al. | |
| 6,725,260 B1 | 4/2004 | Philyaw | |
| 6,742,030 B1 | 5/2004 | MacPhail | |
| 6,785,825 B2 | 8/2004 | Colvin | |
| 6,799,277 B2 | 9/2004 | Colvin | |
| 6,804,257 B1 | 10/2004 | Benayoun et al. | |
| 6,829,596 B1 | 12/2004 | Frazee | |
| 6,857,078 B2 | 2/2005 | Colvin | |
| 6,880,086 B2 | 4/2005 | Kidder et al. | |
| 6,910,072 B2 | 6/2005 | Macleod Beck et al. | |
| 6,920,567 B1 | 7/2005 | Doherty et al. | |
| 6,976,009 B2 | 12/2005 | Tadayon et al. | |
| 7,131,144 B2 | 10/2006 | Rabin et al. | |
| 7,146,645 B1 | 12/2006 | Hellsten al. | |
| 7,319,987 B1 | 1/2008 | Hoffman et al. | |
| 7,457,951 B1 | 11/2008 | Proudler et al. | |
| 7,644,442 B2 | 1/2010 | Miller et al. | |
| 7,739,402 B2 | 6/2010 | Roese | |
| 2001/0034712 A1 | 10/2001 | Colvin | |
| 2001/0034846 A1 | 10/2001 | Beery | |
| 2001/0044782 A1 | 11/2001 | Hughes et al. | |
| 2002/0161718 A1 | 10/2002 | Coley et al. | |
| 2004/0039561 A1 * | 2/2004 | Montano et al. | 703/22 |
| 2004/0059938 A1 | 3/2004 | Hughes et al. | |
| 2005/0108173 A1 | 5/2005 | Stefik et al. | |
| 2005/0216743 A1 | 9/2005 | Peinado | |
| 2006/0265337 A1 | 11/2006 | Wesinger, Jr. | |

FOREIGN PATENT DOCUMENTS

| | | |
|---|---|---|
| EP | 1 096 406 | 5/2001 |
| JP | 4 369 068 | 12/1992 |
| WO | WO 92/09160 | 5/1992 |
| WO | WO 92/20022 | 11/1992 |
| WO | WO 93/01550 | 1/1993 |
| WO | WO 95/35533 | 12/1995 |
| WO | WO 98/42098 | 9/1998 |
| WO | WO 00/67095 | 11/2000 |
| WO | WO 00/72119 | 11/2000 |
| WO | WO 01/55876 | 8/2001 |

OTHER PUBLICATIONS

Williams, R., "A Painless Guide to CRC Error Detection Algorithms," Aug. 13, 1993, 33 pages, www.ross.net/crc/download/crc_v3.txt.

* cited by examiner

Method 100

SOFTWARE PIRACY PREVENTION THROUGH REMOTE ENFORCEMENT OF AN ACTIVATION THRESHOLD

CROSS-REFERENCE TO RELATED APPLICATIONS

This patent application is a continuation of co-pending U.S. patent application Ser. No. 13/196,158, filed Aug. 2, 2011, which is a continuation of U.S. patent application Ser. No. 12/182,135, filed Jul. 30, 2008 now abandoned, which is a continuation of U.S. patent application Ser. No. 11/311,964, filed Dec. 19, 2005 now abandoned, which is a divisional application of U.S. patent application Ser. No. 09/594,004, filed Jun. 14, 2000, now U.S. Pat. No. 7,024,696, and the benefit of such earlier filing dates is hereby claimed by applicant under 35 U.S.C. §120.

BACKGROUND OF THE INVENTION

1. Field of the Invention

The field of the invention generally relates to methods for preventing the piracy of software applications. The invention relates more particularly to a computer method and system for preventing the piracy of a given software application through use of a communications network, such as the Internet, wherein a given software application, installed on a user system, will function only after a remote service provider transmits a code sequence that will activate the software for use.

2. Description of the Related Art

The creation of the personal computer has drastically simplified the way in which people manage their business and personal affairs. One of the main reasons why the computer has had such a great impact on our lives is due to the constant development of software applications which allow the computer to perform an array of different tasks and functions. As software applications advance, however, so too does their complexity and the programming skill needed to write and develop them. This has naturally caused many software applications to be quite expensive. Such high costs have often resulted in unauthorized distribution of copied software that has not been paid for or licensed to the user. This type of piracy is especially common among friends, relatives, and business associates. Additionally, people also profit from piracy by producing illegal copies of a software application and distributing them in mass quantities for drastically reduced prices.

Due to the availability and low cost of sophisticated computer equipment such as the CD Write/Re-Write drive, software piracy has become a much greater concern over the current years. Today, virtually everyone can get access to such equipment and distribute CD based copies of software applications to whomever they please. Mass distribution of pirated software not only deprives software manufacturers of their deserved earnings, but also allows other software pirators to pirate unlicensed copies of that application and propound the damage exponentially. As such, piracy has often resulted in inflated software prices and irreparable damage to software companies.

In an effort to combat the problems of software piracy, many software companies have employed various preventative measures. Some of these include software access codes, activation plugs (i.e., Memo-HASP), registration, and even costly technical support services. Although somewhat effective, these measures have often been defeated with relative ease and little or no expense. For example, software access codes which must be entered to gain access to the software, are disclosed with the software package and are thus, easily copied and distributed to unlicensed users. Activation plugs, such as the ones which attach to the PC's parallel port, have also been easily duplicated by various manufacturers who illegally sell them on the black market. Furthermore, while registration of the software would inform the manufacturer of all users (licensed and unlicensed), pirators rarely register given the absence of a compelling motivation to do so. Lastly, technical support groups are likewise, rarely used by pirators, given their reluctance to disclose their illegal use of the software. As shown by these and other ineffective measures, it would be advantageous for a software manufacturer to control the functionality of a given software application in relation to each of its identified users.

SUMMARY OF THE INVENTION

It is the object of the present invention to provide a reliable and effective method and system for preventing piracy of a given software application over a communications network, whereby the software application will not function unless activated by a remote service provider.

It is further the object of the present invention to provide a method and system for identifying each separate user of a given software application who installs and intends to effectively utilize the given software application.

It is further the object of the present invention to provide a method and system for associating user data to archived data accessible by the remote service provider, in order to determine if the user is a pirator of the software application.

Briefly described, and in accordance with preferred embodiments thereof, the present invention relates to a method and system for preventing piracy of individual software applications. A remote service system, controlled by a remote service provider, storably receives user data that is transmitted by a user of a given software application. Upon receiving the user data, the remote service system associates it to stored archive data which is accessible to the remote service provider. If it is determined that the user is not a pirator of the software, the remote service system will transmit service data which will activate the software and allow the user to utilize its full functionality. In this manner, the remote service provider can limit software piracy, as only legitimate users of the software will be given the service data needed to activate the software.

DETAILED DESCRIPTION OF THE INVENTION

Figure 1:
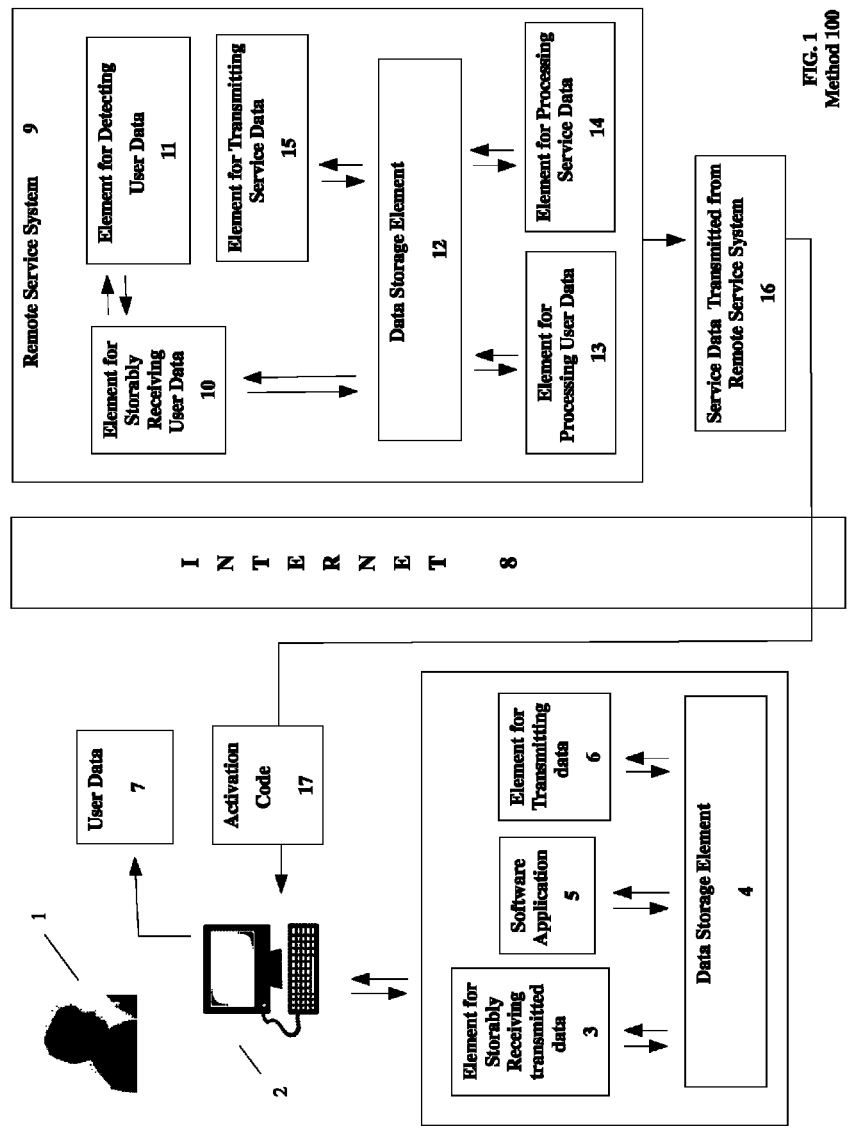
FIG. 1 is an overview diagram pictorially illustrating the flow of information that occurs between a user of a given software application and the remote service system in a preferred embodiment of the method and system for prevention of software piracy according to the present invention.
Figure 2:
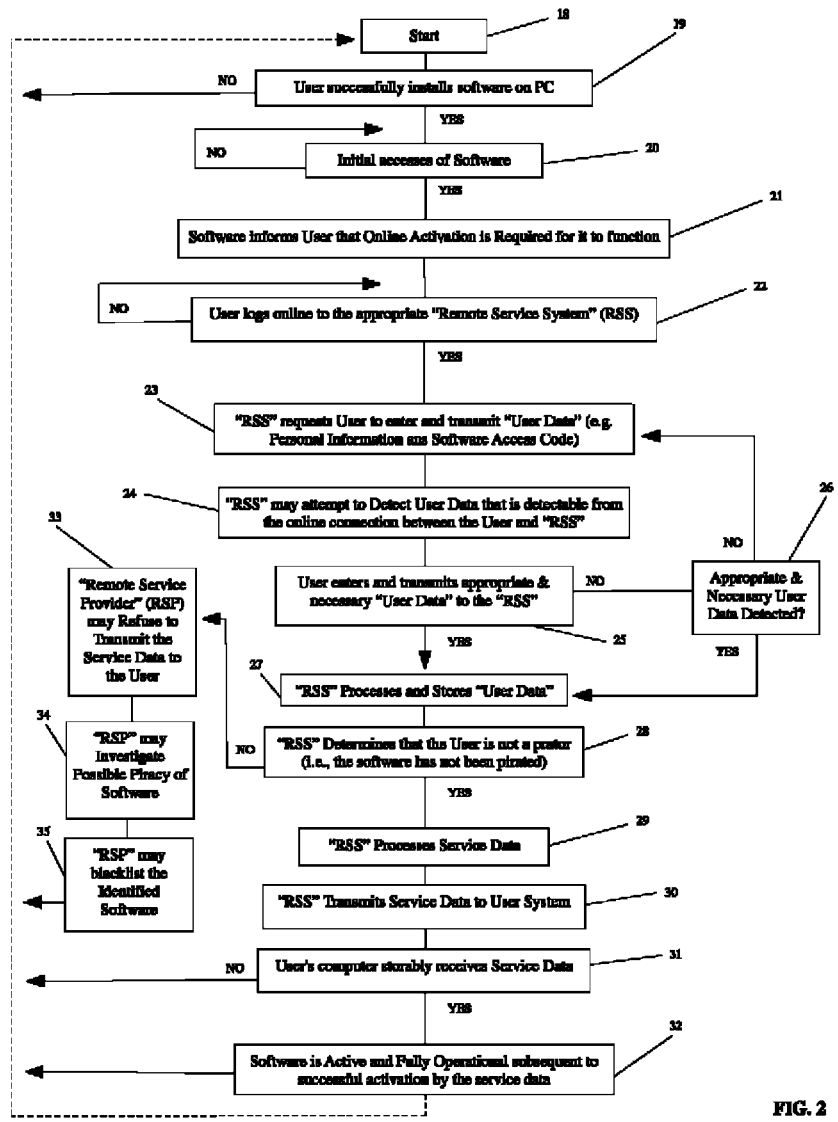
FIG. 2 is a block flowchart of the information flow that occurs in a preferred embodiment of the method and system for prevention of software piracy according to the present invention.

In reference to the drawings, FIGS. 1 and 2 show the information flow that occurs in a method and system (hereinafter "method"), indicated at reference character 100 in FIG. 1, for preventing of piracy of a given software application via a communications network, such as the Internet 8.

Both FIGS. 1 and 2 illustrate the process by which a user would attempt to activate a given software application.

As shown in FIG. 1, the user 1 successfully installs a given software application 5 (hereinafter "software") on the data storage element 4 of the user's system 2. The user system 2 is generally defined as the user's computer terminal, which typically consists of a central processing unit, or CPU (not shown), a data storage element 4, an element for storably receiving transmitted data 3, an element for transmitting data 6, and a monitor and keyboard. While the software 5 may utilize various anti-piracy measures, two such measures, are especially worth noting in relation to the present invention, and are discussed in greater detail below. The first measure is a program code sequence that identifies the specific software 5 (hereinafter "identification code"), while the second is an additional program code sequence that would be needed to activate the software 5 (hereinafter "activation code"). It is preferred that transmission of both of these code sequences, between the user 1 and remote service system 9, would be accomplished over the Internet 8. As used herein, a "user" can be an individual entity or collaborate entity, such as a business, family, or even friends, who legitimately acquired a license and/or right to use the given software 5. Furthermore, the remote service system 9 can be the software manufacturer or an independent company, working in conjunction with the software manufacturer, to prevent software piracy.

Upon an initial attempt to access the installed software 5, user 1 will be informed that the software 5 requires online activation before it can be operational. Online activation will render the given software 5 operational, subject to receiving the activation code from the remote service system 9. This requires that the software 5 be designed wherein it is either partially or completely dysfunctional prior to receiving the activation code, as will be discussed below. By connecting to the remote service system 9 through the Internet 8, a user who is not pirating the software 5 will be able to have the software 5 activated online. Although the Internet 8 is used herein when referencing a communications network, the present invention is intended to include all forms of communications network environments known to one skilled in the relevant art. Thus, method 100 is equally applicable to all interconnected computer systems capable of transmitting and receiving data, preferably digital data, which allow users of the network to communicate. In this regard, a communications network includes, but is not limited to, all telecommunications networks such as the Internet, i.e. the World Wide Web and BBS systems, hardwire telephony, wireless networks including cellular and PCS systems, satellite networks, etc. Furthermore, communications networks include localized and regional networks such as intranets and local area network (LAN) systems which interconnect a relatively few number of user systems or terminals, typically by means of a centralized server.

Once user 1 establishes an online connection to the remote service provider 9, user 1 enters and transmits user data 7, via an element 6 for transmitting user data, to the remote service system 9 over the Internet 8. The user data 7 is subsequently received by the remote service system 9 via an element 10 for storably receiving user data, and stored in the data storage element 12 of the remote service system 9. Although the transfer of user data 7 to the remote service system 9 would preferably be initiated by user 1, this need not always be the case. Once user 1 connects to the remote service system 9 via the Internet 8, the user data 7 may be automatically detected by an element 11 for detecting user data of the remote service system 9. In this case, the detected user data 7 will likewise be received by the remote service system 9 via element 10, and subsequently stored by the data storage element 12 of the remote service system 9. It is notable that the term "user data" is defined and understood herein and in all the claims to mean any information originating from and/or available to the user of the software 5. This includes, but is not limited to personal identification information such as user name, address, location, phone number, etc. Additionally, user data 7 may consist of any information relating to the software 5 which identifies and distinguishes it from other "same type" or distinct software applications. This can include, but is not limited to information such as an "identification code" (as noted earlier), a product serial number, name, and/or version number.

It is worthy to mention that the software 5 should preferably contain an identification code, which is a program code sequence comprised of alphanumeric characters, that would serve to identify each authorized copy of a software application. Given its function, the identification code may be synonymous with a product's distinct serial number. Preferably, the identification code will be unique to each software application sold, and will be disclosed to both user 1 and remote service system 9. The advantage of a unique identification code is that it will allow the remote service system 9 to recognize and keep track of each authentic copy of a software application sold. Although the identification code could consist of an elongated alphanumeric code sequence, such as a "program file(s)", it is preferred that it consist of a short code sequence of alphanumeric characters, e.g. XJR-U89K-RJ2P1. A short identification code sequence will allow the software 5 to be simply and easily identified. It should finally be noted that user data 7 may also refer to information identifying the user system 2 such as serial and model number as well as the type, function, and performance of the various system hardware components.

After receiving and storing user data 7, the remote service system 9 processes the user data 7 via an element 13 for processing user data. Element 13 may be, but is not limited to, software, hardware device(s), or a combination of these two, which would allow for processing of the user data in the manner noted herein. Additionally, element 13, used to process user data, may likewise include the remote service system's personnel staff who would be able to manually initiate processing of the user data, in the manner noted below.

Processing of the user data may include, but is not limited to an "archiving" event wherein a wide range of information that is received by or made available to the remote service system 9 is sorted, arranged, and organized into retrievable data files. Archived data stored in the data storage element 12 of the remote service system 9 may consist of, but is not limited to, a mass assortment of receivably stored user data (e.g. "identification codes"), service data (discussed below), and promotions, etc. Here, the archived data would relate to distinct users, various software applications, and potential advertisements; all of which may exist independently of one another. Second, archived data may also consist of information indicating the amount of user online activation attempts recorded for each identified software 5. Finally, archived data may include all other information that might be of use to the remote service system 9 in preventing piracy of a given software application.

Processing of the user data 7 may also consist of an "associating" event wherein the currently transmitted user data 7 is compared to archived data contained in the data storage element 12 of the remote service system 9. It is important to note that "associating" the currently transmitted user data 7 to archived data will allow the remote service system 9 to determine if the user 7 is attempting to activate a pirated version of the software 5. Here, the "product identification code" of software 5, along with other user data 7 currently being received from the user system 2, will be compared to existing archived data. If the archived data establishes that the software 5 is legally registered to a completely distinct user, such may indicate that the user currently online is trying to activate a pirated version of the software 5. This result will occur if the archived data referencing the software 5 does not match the user data 7 currently being transmitted by the user system 2, and/or if the archived data indicates that there have been repeated and numerous attempts to activate the same software 5.

Multiple online activation attempts of the same software 5, regardless if such attempts are by distinct or the same users, would naturally indicate that the software 5 was pirated and distributed to a multitude of different users. In this situation, the remote service provider may contact the registered user(s) to investigate into potential piracy. Additionally, the remote service system 9 may "blacklist" the specific software 5, as referenced by its identification code. Blacklisting of a given software application would mean that the identified software would be prohibited from receiving any future activation codes from the remote service system 9. For all intents and purposes, such an event would render the identified software void and permanently dysfunctional. This is because the software, as sold to the user, would need the activation code in order to function. Absent this code, the identified software would be inoperative and no longer subject to piracy.

When it is determined by the remote service system 9 that user 1 is not a pirator of the software 5, service data, such as the activation code 17, may be transmitted to the user system 2. The software 5 and/or the user system 2 are responsive to such service data. As used in this invention, the term "service data" is defined and understood herein and in all the claims to mean any data that the remote service system 9 may legitimately transmit to the user system 2 during the online activation process for the software 5. Service data 16 may include, but is not limited to instructions, promotional messages, and an activation code(s). The instructions may guide user 1 through the steps for activating the software 5, while a promotional message program code sequence may offer and display a particular product or service for sale. The activation code 17, as noted earlier, is a program code sequence that will serve to activate each individual software application, which absent the activation code 17, would be dysfunctional. The activation code may either be unique to each individual software 5 sold (hereinafter "unique activation code") or unique to a group of software (hereinafter "common activation code") that relate to a common software program, manufacturer, brand name, or version, etc. Of the two, the preferred embodiment would be the "unique activation code" which is unique to each individual software 5 sold.

One of the main advantages of using a unique activation code is the drastic curtailment of software piracy. Each authorized copy of software application 5 is designed to be responsive to a distinct activation code. As such, an attempt to pirate distinct software applications would entail a tedious and time consuming task requiring the hacker to uncover the activation code of each individual, authorized software product. Furthermore, a unique activation code will not allow for the activation of any "general" copy of the software which would otherwise be responsive to a common activation code. As an alternative to a unique activation code, a common activation code would activate all "same type" software applications. Developing "same type" software to be responsive to a common activation code may be advantageous given the potential for reducing confusion and troubleshooting errors which could arise during the software manufacturing and online activation stages.

It is noteworthy to mention that, similar to the identification code, the activation code may likewise consist of either a long or short program code sequence. As noted earlier, a short code sequence would consist of a concise sequence of alphanumeric characters, e.g. HT3-GY2K-WROP, while a long code sequence would consist of a small or large arrangement of alphanumeric data that result in a "program file(s)". Use of a long code sequence would be the preferred method of constructing the activation code. This is because a long code sequence (i.e. a program file) would be much harder to replicate than a short code sequence. Software application 5 can initially be supplied missing certain program files necessary for software application 5 to function. Only after these missing program files (e.g., the activation code) are transmitted from the remote service system 9 to the user system 2, will the software 5 be functional.

An activated software application will be fully operational and allow the user complete access to it. Although not required, activation code 17 preferably remains undisclosed to user 1. The need for the activation code will compel user 1 to register the software 5 online with the remote service system 9. Furthermore, and more importantly, having the activation code 17 only known to the remote service provider and its business affiliates (such as the software manufacturer) will prevent piracy of the software 5. This is because users who wish to pirate the software 5 will not be able to replicate the activation code and distribute it along with a medium (e.g. CD ROM) containing a copy of the software 5. Activation code 17 is preferably designed to be immune from discovery by computer hackers and sophisticated programmers. The objective is to prevent these individuals from "breaking in" to the software 5 and either re-writing or discovering the undisclosed activation code. As noted earlier, this may require constructing the activation code as a long code sequence which results in a program file(s). Additionally, other measures may include code encryption as well as any other programming methods known to those skilled in the relevant technical art.

Before software application 5 can be activated, the appropriate service data must be processed and transmitted to the user system 2. Processing of the service data 16 requires that it be either extracted or generated from the archived data stored on the data storage element 12 of the remote service system 9. Extraction or generation of the service data 16 is accomplished by an element 14 for processing service data, as referenced in Method 100 of FIG. 1. Element 14 may be, but is not limited to, software, hardware device(s), or a combination of the two, which would allow for processing of the service data, in the manner described herein. Additionally, element 14, used to process service data 16, may likewise include the remote service system's personnel staff who would be able to manually initiate processing of the service data 16, in the manner described herein.

Extraction of service data 16 from the archived data entails a selection process wherein only the appropriate and necessary service data is singled out from the total archived data and made available for transmission to the user system 2. Extraction of the service data is necessary given the variety of software applications, and the multitude of distinct service data entries, that may be stored and archived by the remote service system 9. For example, the activation code "ABC-123", contained in the archived data, would only be extracted when a user 1 who possesses the specific software referencing the identification code "ABC-123" attempts to activate it online. Stated differently, service data containing an activation code relating to MICROSOFT® Word 2000 software application would not be extracted for a user trying to activate a NORTON® Anti-virus software application. The reason for this is that different users will require different service data, depending on the requirements of the specific software that they are attempting to activate.

Alternatively, the second embodiment for processing the service data 16 pertains to an event which causes the service data 16 to be generated. This event entails a process wherein pre-existing archived data may be formulated into the appropriate service data upon request from the remote service system 9. Generation of service data can be advantageous, as this method will permit the remote service system 9 to manipulate various data components, existing in the archived data, in order to formulate the service data 16. For example, the remote service system 9 may combine personal identification information belonging to user 1 with promotional data to formulate a personalized advertisement directed at user 1. Additionally, the remote service system 9 could combine user data (such as the directory file location of the user system 2 that contains the installed software 5) with the appropriate activation code, to formulate a self executing program file which, upon an access event, would automatically install the service data 16 into the correct file location of the user system 2. Formulation of the service data may include, but is not limited to, a series of calculations, combinations, and/or sorting out of the appropriate archived data. Generation of the service data may occur at any time prior to or after the remote service system 9 determines that user 1 is not a pirator of software 5 and is eligible to receive the service data 16.

Once the service data 16 is extracted or generated via element 14 (i.e., the element for processing service data), the remote service system 9 transmits service data 16 to the user system 2. Transmission of the service data 16 may be accomplished in a number of ways. The first two methods involve an event wherein the service data 16 is uploaded into the user system 2, while the third method requires user 1 to download the service data 16 into user system 2. In the first embodiment for uploading the service data 16, the remote service system 9 initiates an uploading event in which the service data is automatically transferred from the remote service system 9 to the user system 2 wherein it is storably received via storage element 3 for storably receiving service data 16. It may be necessary for the remote service system 9 to determine the appropriate file directory location on user system 2 in which to upload the service data. Determination of this location may be accomplished by, but is not limited to, manual selection by user 1, as transmitted by the user (e.g. user data), or via an interactive search of the file directory of user system 2.

In the second embodiment for uploading of service data 16, remote service system 9 manually transmits the service data 16 to the user system 2. Manual transmission of the service data 16 allows remote service system personnel to decide when the transfer sequence should be initiated. Furthermore, manual transmission enables such personnel to manually enter and transmit needed service data 16 which may not have been processed by element 14 within remote service system 9.

Finally, in a third embodiment, the service data 16 is made available to user 1 for downloading into user system 2. The remote service system 9 transfers the archived data 16 into a file that can be downloaded by user 1. The downloaded file contains service data and possibly some elements of user data. As noted earlier, it is preferred that the file contain a self-executing installation program that is triggered upon an access event by the user. For example, as a result of successfully downloading and accessing the file, service data 16 may automatically be installed into the appropriate file directory of the user system 2.

Following successful upload or installation of the service data 16 (e.g., the activation code 17) into the user system 2, the software 5 will gain full functionality. Complete activation of the software 5 will allow user 1 to freely utilize it to its full potential. Preferably, user 1 will never need to go through the online activation process (as mentioned herein) again unless user 1 attempts to install the software 5 on another user system, or attempts to re-install it on current user system 2.

Although many different scenarios can arise during the online activation process of a given software 5, FIG. 2 illustrates, in block diagram form, one possible "real time" cycle run of the present invention. Starting from block 18, user 1 successfully installs a given software application on user system 2, at block 19. Following an initial access event of the software 5, as indicated by block 20, the software 5 proceeds to block 21, and informs user 1 that online activation is required in order for it to function. If user 1 decides to register the software 5, user 1 must connect online to the appropriate remote service system 9, as shown at block 22. At this point, the remote service system 9 may request user 1 to enter and transmit user data 7 to the remote service system 9, as indicated by block 23. The remote service system 9 may also attempt to detect any user data 7 that can be detected by virtue of the online connection between the user system 2 and remote service system 9, as represented by block 24. If the appropriate and necessary user data 7 is entered and transmitted by user 1, at block 25, or detected by the remote service system 9, at block 26, then such user dated is stored and processed by the remote service system 9 as indicated at block 27. It should be noted that, if user 1 fails to provide and transmit the appropriate and necessary user data 7, and/or if remote service system 9 is unable to detect the appropriate and necessary user data 7, the cycle will repeat and be taken back to block 23 of FIG. 2.

The processing of user data 7 allows remote service system 9 to determine if the user is a pirator of the software 5. If remote service system 9 determines that user 1 is not a pirator, at block 28, then service data 16 is processed, at block 29. At this point, remote service system 9 transmits service data 16 to user system 2, at block 30. Transmission may be accomplished via uploading or downloading methods as described earlier. After service data 16 is storably received by user system 2, at block 31, the software 5 will be active and fully operational subject to successful activation by service data 16, as indicated by block 32. In the event that service data 16 is not properly received by user system 2, or fails to activate the software 5, the cycle will repeat, starting from block 18.

Finally, it is noteworthy to mention that, in the event that remote service system 9 determines that user 1 is pirating the software 5, remote service system 9 may refuse to transmit the service data 16, as shown by block 33. Additionally, it may investigate into the possibility of piracy, at block 34, as well as blacklist the identified software 5, as shown by block 35.

The program code sequence, and all other technical aspects described above, are all conventional and known to those skilled in the art and need not be described in detail herein. Furthermore, the term "element", as stated in the specification and all the claims herein, may be construed in the singular and/or the plural tense.

The above-described embodiments of the present invention are to be considered in all respects as illustrative, and not restrictive; the scope of the invention is indicated by the appended claims rather than by the foregoing description. All changes which come within the meaning and range of equivalency of the claims are intended to be embraced therein.

What is claimed is:

1. A method for preventing piracy of software installable in a data storage element on a user's computer, the method comprising:
   (a) receiving, using a remote service system, a unique identification code that uniquely identifies an authentic copy of the software;
   (b) updating, using the remote service system, a number of activation attempts for the authentic copy of the software based on the unique identification code;
   (c) transmitting, using the remote service system, an activation code to the user's computer that activates at least part of the functionality of the authentic copy of the software when the number of activation attempts is less than a predetermined threshold; and
   (d) blacklisting, using the remote service system, the unique identification code when the number of activation attempts is not less than the predetermined threshold, so that the authentic copy of the software is prohibited from receiving any future activation codes from the remote service system.

2. The method of claim 1 further comprising determining, using the remote service system, whether the unique identification code is blacklisted before updating the number of activation attempts for the authentic copy of the software.

3. The method of claim 1 wherein the activation code comprises a missing program file necessary to activate at least part of the functionality of the authentic copy of the software.

4. The method of claim 3 wherein the missing program file is necessary for the software to function and wherein the transmitting step further comprises transmitting instructions for installing the missing program file to activate the software.

5. The method of claim 1 wherein the updating step includes updating, using the remote service system, the number of activation attempts for the authentic copy of the software independent of an identity of a user and an identity of the user's computer.

6. The method of claim 1 further comprising transmitting a notification, using the remote service system, to a registered user corresponding to the unique identification code when the number of activation attempts is not less than the predetermined threshold.

7. A non-transitory computer-readable medium enclosed with a computer program which when executed causes a remote service system to prevent piracy of software installable in a data storage element on a user's computer by:
   (a) receiving a unique identification code that uniquely identifies an authentic copy of the software;
   (b) updating a number of activation attempts for the authentic copy of the software based on the unique identification code;
   (c) transmitting an activation code to the user's computer that activates at least part of the functionality of the authentic copy of the software, when the number of activation attempts is less than a predetermined threshold; and
   (d) blacklisting, using the remote service system, the unique identification code when the number of activation attempts is not less than the predetermined threshold, so that upon any subsequent attempt to activate the uniquely identified authentic copy of the software, the authentic copy of the software is prohibited from receiving any future activation codes from the remote service system.

8. The non-transitory computer-readable medium of claim 7 further comprising determining whether or not the unique identification code is blacklisted before updating the number of activation attempts for the authentic copy of the software.

9. The non-transitory computer-readable medium of claim 7 wherein the activation code comprises a missing program file necessary to activate at least part of the functionality of the authentic copy of the software.

10. The non-transitory computer-readable medium of claim 9 wherein the missing program file is necessary for the software to function and wherein the transmitting step further comprises transmitting instructions for installing the missing program file to activate the software.

11. The non-transitory computer-readable medium of claim 7 wherein the updating step includes updating the number of activation attempts for the authentic copy of the software independent of an identity of a user and an identity of the user's computer.

12. The non-transitory computer-readable medium of claim 7 further comprising transmitting a notification to a registered user corresponding to the unique identification code when the number of activation attempts is not less than the predetermined threshold.

13. A method for preventing piracy of software installable in a data storage element on a user's computer, the method comprising:
   (a) receiving, using a remote service system, user data including (i) personal identification information of the user and (ii) a unique identification code that uniquely identifies a registered copy of the software;
   (b) determining, through comparison of the user data to data archived in the remote service system, whether the user data indicates a valid request to activate software registered to the user; and if so,
   (c) transmitting, using the remote service system, an activation code to the user's computer that activates at least part of the functionality of the registered copy of the software; and
   (d) blacklisting, using the remote service system, the unique identification code when the comparison indicates a mismatch of the user data to the archived data, so that upon any subsequent attempt to activate the uniquely identified registered copy of the software, the authentic copy of the software is prohibited from receiving any future activation codes from the remote service system.

* * * * *